United States Patent [19]
Nakamura et al.

[11] Patent Number: 5,358,678
[45] Date of Patent: Oct. 25, 1994

[54] POLYTETRAFLUOROETHYLENE POROUS FILM AND PROCESS FOR PREPARING THE SAME

[75] Inventors: Atsushi Nakamura, Kanagawa; Satoshi Nakashima, Tokyo, both of Japan

[73] Assignees: Mitsubishi Kasei Corporation; Nippon Valqua Industries, Ltd., both of Tokyo, Japan

[21] Appl. No.: 909,174

[22] Filed: Jul. 6, 1992

Related U.S. Application Data

[63] Continuation-in-part of Ser. No. 907,849, Jul. 2, 1992, abandoned.

[30] Foreign Application Priority Data

Jul. 4, 1991 [JP] Japan .................. 3-164563
Dec. 13, 1991 [JP] Japan .................. 3-330480
Dec. 13, 1991 [JP] Japan .................. 3-330481

[51] Int. Cl.$^5$ .............................................. B27J 5/00
[52] U.S. Cl. .................. 264/127; 264/288.8; 264/DIG. 62; 156/309.9
[58] Field of Search ........... 428/316.6, 304.4, 421; 521/142, 919; 264/DIG. 62, 122, 127, 288.8; 156/309.9

[56] References Cited

U.S. PATENT DOCUMENTS

| | | | |
|---|---|---|---|
| 4,375,441 | 3/1983 | Adams et al. | 264/25 |
| 4,478,665 | 10/1984 | Hubis | 156/229 |
| 4,613,441 | 9/1986 | Kohno et al. | 210/500.36 |
| 4,707,314 | 11/1987 | Kawahigashi et al. | 264/127 |
| 4,710,331 | 12/1987 | Nobuo et al. | 264/41 |

Primary Examiner—George F. Lesmes
Assistant Examiner—C. Raimund
Attorney, Agent, or Firm—Wenderoth, Lind & Ponack

[57] ABSTRACT

A polytetrafluoroethylene (PTFE) porous film is formed from a PTFE resin molding powder obtained by suspension polymerization. The film has a porosity of 40 to 80% and a removal ratio of uniform particles having a diameter of 0.2 μm less than 99%, or has a porosity of 40 to 80% and a bubble point of not less than 3 kg/cm$^2$. This PTFE porous film is obtained by a process of compression-molding a PTFE resin molding powder to prepare a preform, sintering the preform at a temperature not lower than the melting point of the unsintered PTFE, processing the preform into films, then laminating at least two of the obtained films, fusing the films to unite them, and subjecting the obtained film to uniaxial or biaxial stretching at a temperature not higher than a melting point of the sintered PTFE. If desired, the finally obtained film may be subjected to heat setting. In the PTFE porous film of the invention, pores are nearly round and the diameters of the pores are almost uniform. Further, the porous film of the invention has a high porosity and is excellent in mechanical strength, so that the film is free from the pinholes even when the thickness of the film is small. The PTFE porous film can be efficiently prepared by sequential biaxial stretching or the like, without breakage.

6 Claims, 2 Drawing Sheets

POLYTETRAFLUOROETHYLENE POROUS FILM AND PROCESS FOR PREPARING THE SAME

This is a continuation-in-part application of Ser. No. 07/907,849, filed Jul. 2, 1992, now abandoned.

FIELD OF THE INVENTION

The present invention relates to a polytetrafluoroethylene (PTFE) porous film and processes for preparing the same. More particularly, the invention relates to a PTFE porous film which is formed from a molding powder of PTFE obtained by suspension polymerization and which has nearly round and relatively uniform pores and are excellent in water permeability, porosity, mechanical strength and productivity, and also relates to processes for preparing the PTFE porous film.

BACKGROUND OF THE INVENTION

Polytetrafluoroethylene resins are employed in various fields because of their excellent chemical resistance, heat resistance and mechanical properties. For example, porous films made of the PTFE resins are widely employed as filters for corrosive substances or high temperature substances utilizing the above-mentioned excellent properties, and also employed as electrolytic membranes, fuel batteries or medical tubing such as artificial blood vessels and artificial tracheas.

Recently, porous films having pores of nearly round and uniform diameters are demanded in accordance with developments in the semiconductor art or the molecular biology art, because extremely small sized impurities can be removed by the use of those films. As such porous films, PTFE porous films have been the subject of increasing interest.

In a conventional process for preparing porous films of the PTFE resins, extremely small sized particles of PTFE (called fine powder) having a mean primary particle diameter of 0.1 to 0.4 $\mu$m obtained by emulsification polymerization of tetrafluoroethylene are used, and this process comprises the steps of adding a liquid lubricant to the fine powder, compression-preforming the mixture, subjecting the obtained preform to extrusion and/or calendering to give a film, removing the liquid lubricant from the film to obtain a PTFE film, and then subjecting the PTFE film to uniaxial or biaxial stretching under heating. For example, Japanese Patent Publication No. 53(1988)-42794 describes a process for preparing a PTFE porous film characterized by heating a sintered PTFE resin film to a temperature not lower than 327° C. then slowly cooling the film, heat-treating the film so that its crystallinity becomes not less than 80%, and then uniaxially stretching the film within the temperature range of 25° to 260° C. in a draw ratio of 1.5 to 4 times.

In the above process, however, it is difficult to prepare a PTFE porous film having nearly round pores and desired pore sizes. Further, the PTFE film used as a raw film in this process sometimes has pinholes, voids or scratches, and hence the obtained porous film is not always sufficient in mechanical strength.

For solving the above-mentioned problem, there has been proposed a process for preparing a polytetrafluoroethylene porous film which comprising the steps of compression-molding a PTFE resin powder having a mean particle diameter of 1 to 900 $\mu$m obtained by a suspension polymerization to prepare a PTFE preform, sintering the preform at a temperature not lower than 327° C. processing the preform into a film, then sintering the obtained film at a temperature not lower than 327° C. then quenching the film at a cooling rate of 70° C./hr or more to decrease crystallinity of the film to not more than 55%, and uniaxially or biaxially stretching the film in a draw ratio of 1.3 to 6.5 times under heating at a temperature of 100° to 320° C.

However, the PTFE porous film prepared by this process is low both in water permeability and porosity. If the thickness of the film is made smaller to increase water permeability, the film is liable to be broken off during the stretching treatment. Further, even if the stretching treatment is possible, the resulting porous film sometimes suffers visible pinholes having a hole diameter of not less than 0.1 mm. In this process, moreover, sequential stretching can hardly be accomplished made because the porous film is liable to be broken during the stretching treatment, and therefore only single part production (sheet form production) using a simultaneous biaxial stretching is possible. Hence, it is difficult to prepare porous films with high productivity.

OBJECT OF THE INVENTION

The present invention intends to solve the above-mentioned problems associated with the prior art, and an object of the invention is to provide a PTFE porous film with nearly round pores which is excellent in water-permeability, porosity and mechanical strength and free from pinholes so as not to be broken even if the thickness is small, and moreover which can be uniformly prepared with high production efficiency and high stability. Another object of the invention is to provide processes for preparing the PTFE porous films.

SUMMARY OF THE INVENTION

The polytetrafluoroethylene porous film of the invention is a polytetrafluoroethylene porous film which is formed from a polytetrafluoroethylene resin molding powder obtained by a suspension polymerization and has a porosity of 40 to 80%, and a removal ratio of uniform particles having 0.2 $\mu$m diameter of not less than 99%, or has a porosity of 40 to 80% and a bubble point of not less than 3 kg/cm$^2$.

This polytetrafluoroethylene porous film preferably has a thickness of 10 to 500 $\mu$m, and the porous film is preferably obtained from a united product obtained by laminating two or more polytetrafluoroethylene films one upon another and fusing them.

A first process for preparing a polytetrafluoroethylene porous film according to the invention is a process comprising the steps of compression-molding a polytetrafluoroethylene resin molding powder obtained by a suspension polymerization to prepare a polytetrafluoroethylene preform, sintering the preform at a temperature not lower than the melting point of the unsintered polytetrafluoroethylene, processing the sintered preform into films, then superposing two or more of the obtained films one upon another and fusing them at a temperature not lower than the melting point of the sintered polytetrafluoroethylene resin to unite them, followed by cooling, and then subjecting the fused and united film to uniaxial or biaxial stretching at a temperature not higher than a melting point of the polytetrafluoroethylene resin.

A second process for preparing a polytetrafluoroethylene porous film according to the invention is a process comprising the steps of compression-molding the sintered polytetrafluoroethylene resin molding powder obtained by a suspension polymerization to prepare a polytetrafluoroethylene preform, sintering the preform at a temperature not lower than the melting point of the unsintered polytetrafluoroethylene, processing the sintered preform into films, then superposing two or more of the obtained films one upon another and fusing them at a temperature not lower than the melting point of the sintered polytetrafluoroethylene resin to unite them, followed by cooling, then subjecting the fused and united film to uniaxial or biaxial stretching at a temperature not higher than the melting point of the sintered polytetrafluoroethylene resin, and subjected the film to heat setting.

A third process for preparing a polytetrafluoroethylene porous film according to the invention is a process comprising the steps of compression-molding a polytetrafluoroethylene resin molding powder obtained by a suspension polymerization to prepare a polytetrafluoroethylene preform, sintering the preform at a temperature not lower than the melting point of the unsintered polytetrafluoroethylene, processing the sintered preform into films, then heating at least two of the obtained polytetrafluoroethylene films at a temperature lower than the melting point of the sintered polytetrafluoroethylene to contact bond them, further heating the polytetrafluoroethylene film bonded product at a temperature not lower than the melting point of the sintered polytetrafluoroethylene to fuse and unite it, and subjecting the fused and united film to uniaxial or biaxial stretching at a temperature not higher than the melting point of the sintered polytetrafluoroethylene resin.

A fourth process for preparing a polytetrafluoroethylene porous film according to the invention is a process comprising the steps of compression-molding a polytetrafluoroethylene resin molding powder obtained by a suspension polymerization to prepare a polytetrafluoroethylene preform, sintering the preform at a temperature not lower than the melting point of the unsintered polytetrafluoroethylene, processing the sintered preform into films, then heating at least two of the obtained polytetrafluoroethylene films at a temperature lower than a melting point of the sintered polytetrafluoroethylene to be contact bond them, further heating the polytetrafluoroethylene film bonded product at a temperature not lower than melting point of the sintered polytetrafluoroethylene to fuse and unite it, subjecting the fused and united film to uniaxial or biaxial stretching at a temperature not higher than the melting point of the sintered polytetrafluoroethylene resin, and subjecting the film to heat setting.

DETAILED DESCRIPTION OF THE INVENTION

Figure 1:
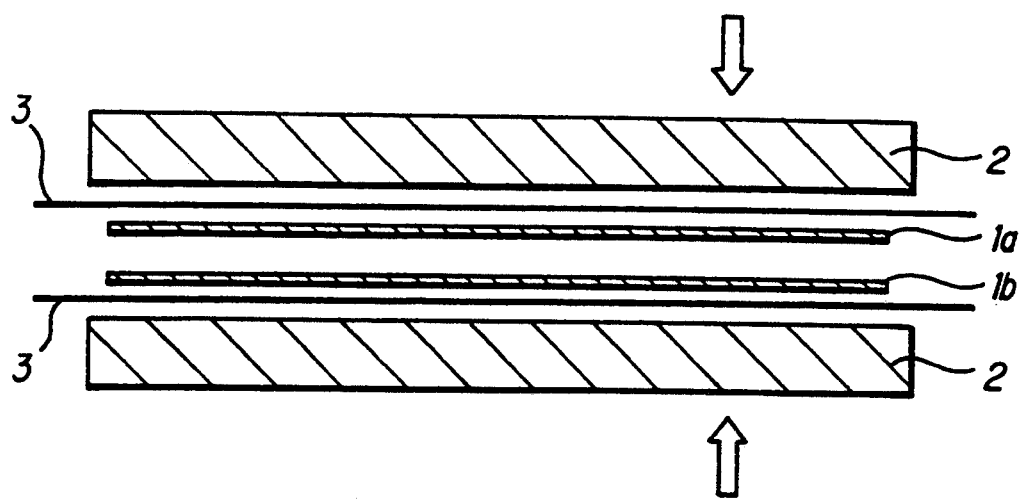
FIG. 1 is a schematic sectional view showing steps of the process for preparing a PTFE porous film in one embodiment of the invention.

The polytetrafluoroethylene (PTFE) porous film of the invention and the processes for preparing the porous film are described in detail hereinafter.

The PTFE porous film of the invention is prepared from a polytetrafluoroethylene resin molding powder (PTFE molding powder) obtained by a suspension polymerization.

In the PTFE porous film prepared from the PTFE molding powder, it is possible to make pores which are nearly round and to make the diameters of the pores uniform and fixed ones.

The PTFE porous film of the invention has a porosity (pore volume) of 40 to 80%, preferably 45 to 70%, particularly 45 to 60%. In this specification, the porosity of the PTFE porous film is determined in the following manner.

Measurement of porosity

Thickness and weight of a circular standard sample of flat membrane (26 mm diameter) are measured. The porosity Pv (pore volume) is determined by the following formula:

$$Pv = \frac{\rho V - w}{\rho V} \times 100$$

wherein $\rho$ is density, V is volume of membrance, and w is weight.

Further, the PTFE porous film of the invention has a removal ratio of uniform particle having 0.2 $\mu$m diameter of not less than 99%. Otherwise, the PTFE porous film of the invention has a bubble point of not less than 3 kg/cm$^2$, preferably not less than 4 kg/cm$^2$.

In the present specification, the removal ratio of uniform particle and the bubble point are determined in the following manners.

Measurement of the removal ratio of uniform particle

To the circular membrane (26 mm diameter) is passed through ultra-pure water dispersion containing uniform particles of commercially available polystyrene latex, e.g. produced by Magsfear Co., Ltd., in an amount of 1.4×10$^{13}$ particles/ml. The passed medium is introduced into a cell, and the absorbance thereof is measured at the wavelength of 400 nm. The removal ratio of uniform particle is determined by the following formula:

$$\text{Removal ratio} = \frac{\text{Absorbance of latex containing dispersion} - \text{Absorbance of filtrate}}{\text{Absorbance of latex containing dispersion}} \times 100$$

The minimum particle diameter of which the removal ratio of uniform particle becomes 100% is considered to be the pore size of the porous film. That is, when uniform particles of polystyrene latex having 0.069 $\mu$m diameter are perfectly removed (100%), the pore size of the porous film is considered as 0.069 $\mu$m.

Measurement of the bubble point

The bubble point was measured in accordance with ASTM-F-316.

The bubble point method is known as a way for determinating the greatest pore size in the porous film. The bubble point indicates the minimum pressure at which gas flows off the fluid membrane immersed in a small pore, and becomes an index of pore size in the porous film Furthermore, it is desired that the PTFE porous film of the invention has a water permeability Q of 200 to 4,000 liter/hr·m$^2$·atm, preferably 800 to 2000 liter/hr·m$^2$·atm. In this specification, the water permeability Q can be determined in the following manner.

Measurement of the water permeability Q

The porous film is immersed in 100% ethanol to be hydrophilic. Successively, ultra-pure water is passed through the porous film to replace ethanol with ultra-pure water. The flow rate of filtered ultra-pure water is measured at 23° C. under a differential pressure of 4 kg/cm².

The water permeability Q is determined by the following formula:

$$Q = \frac{V}{S \cdot T \cdot P}$$

wherein S is membrane surface area, T is filtration time, P is differential pressure at filtration, and V is an amount of filtered water (ml).

It is also desired that the PTFE porous film has a thickness of 10 to 500 μm, preferably 15 to 100 μm. Moreover, this PTFE porous film is preferably obtained from a united product obtained by laminating two or more PTFE films one upon another and fusing them.

In the case of forming the PTFE porous film from a united product obtained by laminating two or more PTFE films one upon another and fusing them, even if one of the PTFE films has pinholes, voids or scratches, those pinholes, voids or scratches can be recovered by laminating the film on other film PTFE and fusing them together. As a result, a PTFE porous film improved in the mechanical strength and sufficiently controlled in the pore diameters can be obtained.

As described above, the PTFE porous film of the invention has a great number of extremely small sized pores with uniform pore diameters, so that it is excellent in the porosity. Further, the crystallinity of the porous film can be lower than 65%.

Next, the processes for preparing the PTFE porous film according to the invention are described below.

A starting material used in the processes for preparing the PTFE porous film according to the invention is a polytetrafluoroethylene powder obtained by a suspension polymerization of tetrafluoroethylene, wherein the polytetrafluoroethylene powder has a mean particle diameter of preferably 1 to 900 μm, more preferably 1 to 50 μm.

The PTFE porous film can be prepared from the above-mentioned PTFE resin powder by a process of the following steps.

In the first place, the polytetrafluoroethylene powder (PTFE molding powder) obtained by a suspension polymerization is compression-molded to prepare a preform, and the preform is sintered at a temperature not lower than the melting point to prepare a of the unsintered polytetrafluoroethylene polytetrafluoroethylene molded product. In more detail, the PTFE preform mentioned. as above can be obtained by molding a polytetrafluoroethylene powder (i.e., molding powder) prepared by a suspension polymerization of tetrafluoroethylene in a mold or the like under a molding pressure of 100 to 350 kg/cm². Then, the preform is sintered at a temperature not lower than the melting point of the unsintered polytetrafluoroethylene powder, preferably a temperature of 350° to 380° C. and then slowly cooled to obtain a PTFE molded product. The melting point of the unsintered polytetrafluoroethylene can be determined by analyzing the polytetrafluoroethylene powder obtained by a suspension polymerization using a differential scanning calorimeter (DSC) and taking the peak value on the DSC chart as the melting point of the unsintered polytetrafluoroethylene.

The PTFE molded product is usually in the shape of a block (in the shape of cylinder), but it may be molded into other shapes such as the shape of a film, rod or sheet depending on the use or application. For example, for preparing a film from the block-shaped PTFE molded product, the block-shaped molded product is cut into a film having a thickness of about 0.01 to 2 mm, preferably about 0.02 to 0.2 mm, using a film cutting machine, etc. There is no specific limitation on the thickness of the filmy PTFE molded product obtained as above. The filmy PTFE molded product is also referred to as a "raw film" hereinafter.

In the above, the PTFE film (i.e., filmy PTFE molded product) is obtained by sintering the PTFE preform and then cutting it, but a PTFE film obtained by methods the than the cutting method can be also employed in the invention. In other Words, any PTFE films can be employed in the invention, with the proviso that they are PTFE films obtained by compression-molding a PTFE molding powder having a mean particle diameter of 1 to 900 μm obtained by a suspension polymerization and then sintering the resulting preform.

In the first process according to the invention, at least two of the filmy PTFE molded products obtained as above are superposed one upon another, as shown in FIG. 1, and they are fused at a temperature not lower than the melting point of the sintered polytetrafluoroethylene resin, preferably a temperature of 340° to 400° C., so as to be united, and then cooled. The melting point of the sintered polytetrafluoroethylene resin is determined by analyzing the above-prepared sintered polytetrafluoroethylene by means of DSC and taking the peak value on the DSC chart as the melting point of the sintered polytetrafluoroethylene. The number of the PTFE films used herein is two or more, preferably in the range of 2 to 10, more preferably in the range of 2 to 4.

The heating means used in the above process is, for example, a metal plate press 2 shown in FIG. 1. Between the PTFE film and the metal plate press, an aluminum foil 3 or the like may be interposed. Cooling of the fused PTFE film may be either a slow cooling or a rapid cooling. The filmy PTFE molded products are heated to a temperature not lower than the melting point of the sintered polytetrafluoroethylene and fused so as to be united as described above, whereby both films compensate each other for interparticle defects existing within the film and scratches on the surface of the film given by the cutting procedure, such defects and scratches causing breakage of the film during the stretching treatment. As a result, occurrence of breakage in the stretching treatment can be prevented. For fusing and uniting the filmy PTFE molded products, any method can be employed with the proviso that two or more of the films can be fused and united. In the present invention, as described above, a cause of breakage during the stretching treatment is removed by fusing and uniting two or more of the films.

Examples of the methods for fusing and uniting the films include the above-mentioned method of using the metal plate press; a method of using a roll press; a method of winding the films around a cylinder, and fusing and uniting the films on the cylinder utilizing expansion of the cylinder; a method of winding the films around a cylinder, further winding a heat-shrinkable film therearound by interposing an aluminum foil or the like and fusing the films on the cylinder utilizing tension given by the heat shrinkage; and other methods. However, in the case where the films have a free surface (surface exposed to air) and the fusing procedure takes a long period of time (e.g., more than 20 minutes at 350° C.), particulate protuberances might be produced on the free surface of the film and those protuberances cause a decrease of water permeability. Therefore, the fusing procedure is preferably carried out under the condition that the films to be fused do not have such a free surface. In other words, all over the surface of the raw film, laminate is preferably in contact with a pressure means such as a metal plate press. The pressure in the fusing procedure in the invention is generally within the range of 0.01 to 10 kg/cm$^2$, preferably 0.03 to 10 kg/cm$^2$, more preferably not higher than 1 kg/cm$^2$.

Through the above-mentioned treatment, pores of the finally obtained PTFE porous film can be controlled to have fixed sizes and can be made nearly round. Further, this treatment can increase the porosity of the finally obtained PTFE porous film and also increase the mechanical strength thereof. The fused and united PTFE film obtained by the above treatment is free from occurrence of breakage or pinholes in the subsequent stretching treatment.

The fused and united PTFE film prepared as above is then uniaxially or biaxially stretched at a temperature not higher than the melting point of the sintered polytetrafluoroethylene, preferably 19° to 320° C., more preferably 50° to 290° C. in the uniaxial direction in a draw ratio of 1.3 to 6.5 times, or in the biaxial directions each in a draw ratio of 1.3 to 6.5 times, preferably in the uniaxial direction in a draw ratio of 1.8 to 3.0 times, or in the biaxial directions each in a draw ratio of 1.8 to 3.0 times. In the case of utilizing a biaxial stretching, the film may be subjected to so-called "sequential biaxial stretching", that is, the film is first uniaxially stretched in the machine direction and then uniaxially stretched in the transverse direction. In this case, the stretching in the transverse direction can be made prior to the stretching in the machine direction. Further, a simultaneous biaxial stretching can be also adopted. The stretching speed of the film is preferably not less than 15 mm/sec when a film having a 200 mm length in the machine direction is used. In other words, the draw ratio is preferably larger than 450 %/min.

By subjecting the fused and united PTFE film to the biaxial stretching, the shapes of the pores in the resulting PTFE porous film are almost perfectly round. If the stretching temperature of PTFE is lower than 19° C., a breakage or other defect is observed in the resulting PTFE porous film and the PTFE porous film is insufficient in mechanical strength, so that such temperature is unfavorable, On the other hand, if the temperature of PTFE is higher than 320° C. pores of uniform diameters cannot not be produced in the resulting PTFE porous film, so that such temperature is unfavorable.

In the second process according to the invention, the PTFE porous film obtained by the above-mentioned first process is further subjected to heat setting. This heat setting is carried out at a temperature not lower than 150° C. preferably in the range of not lower than 150° C. but lower than the Melting point of PTFE porous film, more preferably in the range of 200° to 300° C., while keeping the fixed temperature. This heat setting is particularly preferred especially when the fused and united PTFE film is stretched at a low temperature, for example, a temperature lower than 140° C. to prepare a PTFE porous film.

By carrying out such heat setting after the stretching of the PTFE film, a PTFE porous film much more improved in the stability of pore sizes can be obtained.

Further, owing to the heat setting, the water permeability and the porosity of the resulting PTFE porous film can be enhanced, and the heat shrinkage thereof can be reduced.

The heat setting is preferably carried out by fixing the peripheral portion of the PTFE porous film with a chuck (supporting tool), stretching the PTFE porous film in a draw ratio slightly higher than the predetermined draw ratio, and then returning the draw ratio to the predetermined draw ratio.

In the third process according to the invention, the aforementioned PTFE resin molding powder obtained by a suspension polymerization is compression-molded to prepare a PTFE preform; the preform is sintered at a temperature not lower than the melting point of the unsintered PTFE; then the preform is processed to give raw films; and two or more of the raw films are contact bonded under heating at a temperature of not higher than the melting point of the sintered polytetrafluoroethylene so as to be united.

Figure 2:
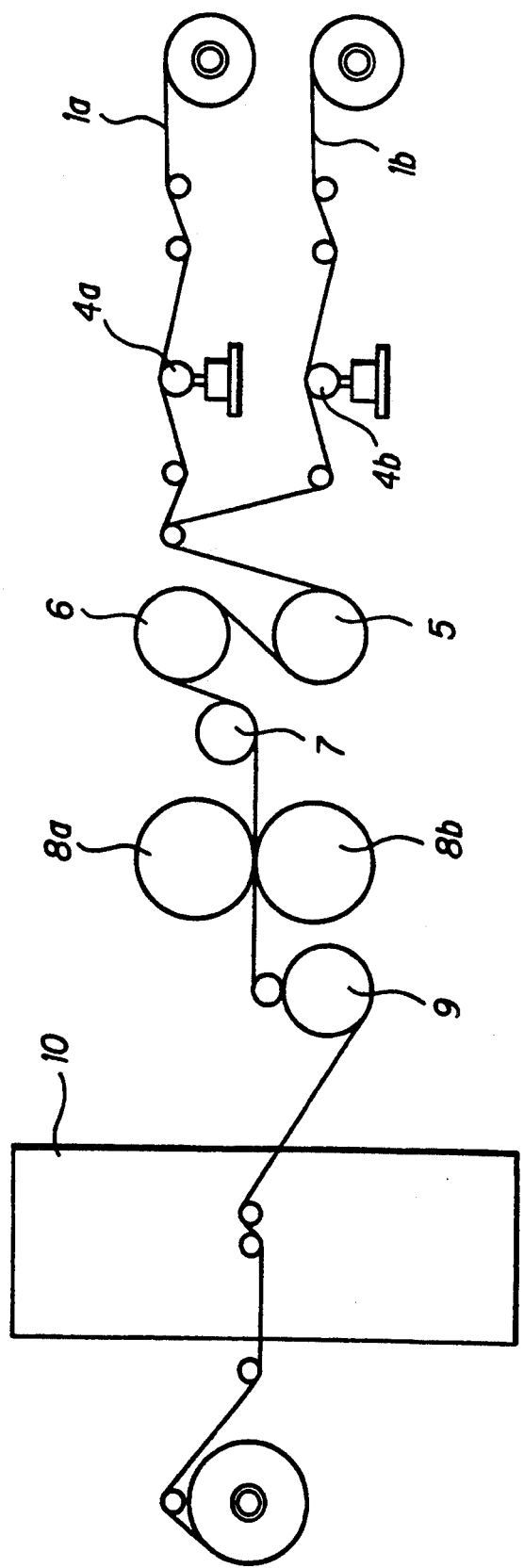
FIG. 2 is a view showing steps of the process for preparing a PTFE porous film in another embodiment of the invention.

For example, as shown in FIG. 2, two of the raw films 1a, 1b having a thickness of about 0.01 to 2.0 mm, preferably about 0.02 to 0.2 mm, are superposed one upon another by way of tension controls 4a, 4b, and the raw films are heated at a temperature not higher than the melting point of the sintered polytetrafluoroethylene, preferably 100° to 300° C., more preferably 140° to 250° C., so as to be bonded.

The number of the raw films to be contact bonded under heating is at least two, preferably 2 to 10, more preferably 2 to 4. For heating at least two of the raw films to a temperature not higher than the melting point, rolls 5, 6, 7 are heated to make a preheating zone.

The bonding of at least two of the raw films can be carried out, for example, by passing at least two of the raw films through a pair of pressure rolls 8a, 8b. In this case, it is desired that at least two of the raw films are rolled and bonded in such a manner that $T_2/T_1$ is 0.3 to 0.9, preferably 0.5 to 0.9, wherein $T_1$ (mm) is a total thickness of all of the raw films and $T_2$ (mm) is a thickness of the resulting PTFE bonded film (PTFE film bonded product) obtained by bonding the films through the pressure rolls.

By contact bonding at least two of the PTFE films as described above, no air is present between the PTFE films, and thereby a PTFE film bonded product having a uniform thickness can be obtained.

The PTFE film bonded product prepared as above is then desirably cooled by means of, for example, a water-cooling roll 9.

Subsequently, the PTFE film bonded product is heated to a temperature not lower than the melting point of PTFE the sintered preferably not lower than 327° C., more preferably in the range of 340° to 400° C. by for example passing the product through a heating zone 10, so as to fuse and unite the bonded films. The heating time varies depending on the heating temperature, but generally is in the range of 10 seconds to 30 minutes or thereabouts.

During the above-mentioned procedure of fusing the PTFE film bonded product, a tension may be applied to the PTFE film bonded product by means of a tension controller or the like.

In the invention, at least two of the raw films are heated at a temperature lower than the melting point of the sintered polytetrafluoroethylene so as to be bonded and then the resulting PTFE bonded films are heated at a temperature not lower than a melting point of the sintered polytetrafluoroethylene so as to be united, as described above. Accordingly, even if one of the PTFE films has scratches, pinholes or voids, other PTFE film(s) recover the defects, and the united PTFE film is free from such scratches, pinholes or voids. As a result, the PTFE film can be prevented from occurrence of breakage in the subsequent stretching treatment.

The fused and united PTFE film prepared as above is then subjected to uniaxial or biaxial stretching at a temperature not higher than a melting point of the PTFE the sintered resin in the same manner as that of the aforementioned first or second process. The stretching conditions are the same as those mentioned before.

By subjecting the PTFE film to the biaxial stretching, the shapes of the pores in the resulting PTFE porous film are almost perfectly round. Further, since the stretching is carried out within the aforementioned temperature range, the obtained PTFE porous film is excellent in mechanical strength and has pores of uniform diameters.

In the fourth process according to the invention, the PTFE porous film obtained by the above-mentioned third process is further subjected to heat setting. The conditions for this heat setting are the same as those of the aforementioned second process.

EFFECT OF THE INVENTION

The PTFE porous film of the invention has nearly round pores with uniform pore diameters, and shows a high porosity and a high mechanical strength, so that the PTFE porous film is free from occurrence of pinholes even when the thickness thereof is made small. Further, according to the processes of the invention for preparing a PTFE porous film, a PTFE porous film having the above-mentioned excellent properties can be prepared with high efficiency utilizing a sequential biaxial stretching or the like, and the obtained PTFE porous film is free from occurrence of breakage.

The present invention is further illustrated by the following examples and comparative examples, but these examples by no means restrict the invention.

EXAMPLE 1

A PTFE molding powder (Polyflon M-12, available from Daikin Kogyo K.K.) having a mean particle diameter of 20 $\mu$m obtained by a suspension polymerization was molded in a mold at a molding pressure of 150 kg/cm$^2$ and then sintered at 365° C., to obtain a PTFE molded product in the shape of block.

The obtained block-shaped molded product was skived to give a filmy PTFE molded product (1) having a thickness of 30 $\mu$m. Then, two of the obtained filmy PTFE molded products (1) were superposed one upon another, and they were heated at a temperature of 350° C. under a pressure of 0.5 kg/cm$^2$ for 30 minutes to fuse and unite them, followed by cooling at a cooling rate of 5° C./min, to prepare a PTFE molded product (2) (200 mm×200 mm). The PTFE molded product (2) was then stretched in the biaxial directions simultaneously each in a draw ratio of 1.8 times.

The obtained PTFE porous film had a thickness of 30 $\mu$m and a size of 360 mm×360 mm. The number of pinholes in the porous film was 0 per 1 cm$^2$.

COMPARATIVE EXAMPLE 1

The procedure of Example 1 was repeated except for stretching the filmy PTFE molded product (1) of 30 $\mu$m in thickness obtained by skiving the block-shaped preform, without superposing and fusing two of them, to prepare a PTFE porous film.

The number of pinholes in the obtained porous film was 1.02 per 1 cm$^2$.

EXAMPLE 2

Two of the PTFE molded products (1) obtained in Example 1 were superposed one upon another, and they were wound around a cylinder. Further, a PTFE heat-shrinkable tape was wound therearound by interposing an aluminum foil, and they were heated altogether at 370° C. for 2 hours to fuse and unite the PTFE molded products (1) by the tension provided by the heat shrinkage of the heat-shrinkable tape. Then, the fused and united PTFE molded product was cooled to prepare a PTFE molded product (2'). The cooling rate in the cooling procedure was 5° C./hr. The PTFE molded product (2') was then stretched at 270° C. in the biaxial directions simultaneously each in a draw ratio of 1.8 times. The obtained porous film had a thickness of 33 $\mu$m, a water permeability Q of 915 liter/hr·m$^2$·atm and a porosity of 51%. This porous film showed high values both in water permeability and porosity.

EXAMPLE 3

The PTFE molded product (2) obtained in Example 1 was stretched at 290° C. in the biaxial directions sequentially each in a draw ratio of 1.8 times. The obtained PTFE porous film had a thickness of 30 $\mu$m, a water permeability Q of 374 liter/hr·m$^2$·atm and a porosity of 47%. Further, the porous film had a tensile strength at break of 280 kgf/cm$^2$ in the machine direction (M.D.) and that of 250 kgf/cm$^2$ in the transverse direction (T.D.).

COMPARATIVE EXAMPLE 2

The filmy PTFE molded product (1) obtained in Example 1 was subjected to sequential stretching in the same manner as described in Example 3 without superposing and fusing two of the molded products (1), but the PTFE molded product (1) was broken off.

If the thickness of the filmy PTFE molded product (1) is not less than 0.1 mm, the sequential stretching is possible.

EXAMPLE 4

The PTFE molded product (2) obtained in Example 1 was stretched at 160° C. in the biaxial directions sequentially each in a draw ratio of 2.1 times (stretching speed: 50 mm/sec). The obtained PTFE porous film had a thickness of 31 $\mu$m, a water permeability Q of 719 liter/hr·m$^2$·atm and a porosity of 48%.

EXAMPLE 5

The PTFE molded product (2) obtained in Example 1 was stretched at 127° C. in the biaxial directions sequentially each in a draw ratio of 2.1 times (stretching speed: 40 mm/sec). The obtained PTFE porous film had a thickness of 34 $\mu$m, a water permeability Q of 719 liter/hr·m$^2$·atm and a porosity of 50%.

EXAMPLE 6

The PTFE molded product (2) obtained in Example 1 was stretched at 76° C. in the biaxial directions sequentially each in a draw ratio of 2.2 times (stretching speed: 50 mm/sec). The obtained PTFE porous film had a thickness of 34 $\mu$m, a water permeability Q of 621 liter/hr·m$^2$·atm and a porosity of 53%.

EXAMPLE 7

The PTFE molded product (2) obtained in Example 1 was stretched at 64° C. in the biaxial directions sequentially each in a draw ratio of 2.19 times (stretching speed: 20 mm/sec). The obtained PTFE porous film had a thickness of 34 μm, a water permeability Q of 716 liter/hr·m²·atm and a porosity of 52%.

EXAMPLE 8

The PTFE molded product (2) obtained in Example 1 was stretched at 122° C. in the biaxial directions sequentially each in a draw ratio of 2 times (stretching speed: 30 mm/sec). The obtained PTFE porous film had a thickness of 35 μm, a water permeability Q of 580 liter/hr·m²·atm and a porosity of 47%.

EXAMPLE 9

The PTFE molded product (2) obtained in Example 1 was stretched at 118° C. in the biaxial directions sequentially each in a draw ratio of 2.1 times (stretching speed: 60 mm/sec). The obtained PTFE porous film had a thickness of 36 μm, a water permeability Q of 653 liter/hr·m²·atm and a porosity of 51%.

EXAMPLE 10

The PTFE molded product (2) obtained in Example 1 was stretched at 66° C. in the biaxial directions sequentially each in a draw ratio of 2.2 times (stretching speed: 70 mm/sec). The obtained PTFE porous film had a thickness of 35 μm, a water permeability Q of 550 liter/hr·m²·atm and a porosity of 51%.

EXAMPLE 11

The PTFE molded product (2) obtained in Example 1 was stretched at 68° C. in the biaxial directions sequentially each in a draw ratio of 2.75 times (stretching speed: 50 mm/sec). Then, the draw ratio was returned to 2.1 times and the resulting product was subjected to heat setting at 170° C. for 5 minutes. The obtained PTFE porous film had a thickness of 36 μm, a water permeability Q of 720 liter/hr·m²·atm and a porosity of 53%.

EXAMPLE

The PTFE molded product (2) obtained in Example 1 was stretched at 75° C. in the biaxial directions sequentially each in a draw ratio of 2.75 times (stretching speed: 50 mm/sec). Then, the draw ratio was returned to 2.1 times and the resulting product was subjected to heat setting at 200° C. for 5 minutes. The obtained PTFE porous film had a thickness of 36 μm, a water permeability Q of 779 liter/hr·m²·atm and a porosity of 52%.

EXAMPLE

The PTFE molded product (2) obtained in Example 1 was stretched at 73° C. in the biaxial directions sequentially each in a draw ratio of 2.75 times (stretching speed: 50 mm/sec). Then, the draw ratio was returned to 2.1 times and the resulting product was subjected to heat setting at 250° C. for 5 minutes. The obtained PTFE porous film had a thickness of 37 μm, a water permeability Q of 981 liter/hr·m2·atm and a porosity of 53%.

EXAMPLE 14

The PTFE molded product (2) obtained in Example 1 was stretched at 77° C. in the biaxial directions sequentially each in a draw ratio of 2.81 times (stretching speed: 50 mm/sec). Then, the draw ratio was returned to 2.15 times and the resulting product was subjected to heat setting at 200° C. for 5 minutes. The obtained PTFE porous film had a thickness of 35 μm, a water permeability Q of 1,024 liter/hr·m²·atm and a porosity of 54%.

EXAMPLE 15

A PTFE molding powder (Polyflon M-12, available from Daikin Kogyo K.K.) having a mean particle diameter of 20 μm obtained by a suspension polymerization was molded in a mold at a molding pressure of 175 kg/cm² and then sintered at 365° C., to obtain a PTFE molded product in the shape of block.

The obtained block-shaped molded product was skived to give a filmy PTFE molded product (3) having a thickness of 30 μm. Then, two of the filmy PTFE molded products (3) were superposed one upon another and they were bonded under heating at a temperature of 160° C. to obtain a polytetrafluoroethylene film bonded product having a thickness of 37 μm. The obtained polytetrafluoroethylene film bonded product was heated at 350° C. for 1 hour, subsequently quenched to obtain a fused and united PTFE molded product (4). The thickness of the PTFE molded product (4) was 61.1 μm. The cooling rate in the cooling procedure was 15° C./min.

The PTFE molded product (4) obtained as above was stretched at 50° C. in the biaxial directions sequentially each in a draw ratio of 2.1 times (stretching speed: 50 mm/sec). The obtained PTFE porous film had a thickness of 37 μm, a water permeability Q of 380 liter/hr·m²·atm, a porosity of 49%, and a removal ratio of uniform particles having 0.038 μm diameter of 100%. Further, the number of pinholes in this PTFE porous film was 0 per 1 cm².

COMPARATIVE EXAMPLE 3

The procedure of Example 15 was repeated except for stretching the filmy PTFE molded product (3) of 30 μm in thickness obtained by skiving the block-shaped molded product without superposing and fusing two of them, to prepare a PTFE porous film.

The number of pinholes in the obtained PTFE porous film was 1.02 per 1 cm².

EXAMPLE 16

The PTFE molded product (4) obtained in Example 15 was stretched at 72° C. in the biaxial directions sequentially each in a draw ratio of 2.13 times (stretching speed: 50 mm/sec). The obtained PTFE porous film had a thickness of 36 μm, a water permeability Q of 460 liter/hr·m²·atm and a porosity of 52%.

EXAMPLE 17

The PTFE molded product (4) obtained in Example 15 was stretched at 290° C. in the biaxial directions sequentially each in a draw ratio of 1.8 times. The obtained PTFE porous film had a thickness of 30 μm, a water permeability Q of 374 liter/hr·m²·atm and a porosity of 47%. Further, the porous film had a tensile strength at break of 280 kgf/cm² in the machine direction (M.D.), that of 250 kgf/cm² in the transverse direction (T.D.), a removal ratio of uniform particles having 0.038 μm diameter of 95%, and bubble point value of 4.2 kg/cm².

COMPARATIVE EXAMPLE 4

The filmy PTFE molded product (3) having 30 μm thickness obtained in Example 15 was subjected to sequential stretching in the same manner as described in Example 16 without laminating and fusing two of them, but the filmy PTFE molded product (3) was broken off.

If the thickness of the filmy PTFE molded product (3) is not less than 0.1 mm, sequential stretching is possible.

EXAMPLE 18

The PTFE molded product (4) obtained in Example 15 was stretched at 160° C. in the biaxial directions sequentially each in a draw ratio of 2.1 times (stretching speed: 50 mm/sec). The obtained PTFE porous film had a thickness of 31 μm, a water permeability Q of 719 liter/hr·m²·atm, a porosity of 48%, a removal ratio of uniform particles having 0.038 μm diameter of 89%, and a removal ratio of 100% for particles having a 0.069 μm diameter.

EXAMPLE 19

The PTFE molded product (4) obtained in Example 15 was stretched at 127° C. in the biaxial directions sequentially each in a draw ratio of 2.1 times (stretching speed: 40 mm/sec). The obtained PTFE porous film had a thickness of 34 μm, a water permeability Q of 719 liter/hr·m²·atm, a porosity of 50%, a removal ratio of uniform particles having 0.038 μm diameter of 97%, and a removal ratio of 100% for particles having a 0.069 μm diameter.

EXAMPLE 20

The PTFE molded product (4) obtained in Example 15 was stretched at 76° C. in the biaxial directions sequentially each in a draw ratio of 2.2 times (stretching speed: 50 mm/sec). The obtained PTFE porous film had a thickness of 34 μm, a water permeability Q of 621 liter/hr·m2·atm, a porosity of 53%, a removal ratio of uniform particles having 0.038 μm diameter of 99%, and a removal ratio of 100% for particles having a 0.069 μm diameter.

EXAMPLE 21

The PTFE molded product (4) obtained in Example 15 was stretched at 72° C. in the biaxial directions sequentially each in a draw ratio of 2.75 times (stretching speed: 50 mm/sec). Then, the draw ratio was returned to 2.1 times and the resulting product was subjected to heat setting at 170° C. for 5 minutes. The obtained PTFE porous film had a thickness of 36 μm, a water permeability Q of 819 liter/hr·m²·atm, a porosity of 55%, a removal ratio of uniform particles having 0.038 μm diameter of 85%, and a removal ratio of 100% for particles having a 0.069 μm diameter.

EXAMPLE 22

The PTFE molded product (4) obtained in Example 15 was stretched at 77° C. in the biaxial directions sequentially each in a draw ratio of 2.75 times (stretching speed: 50 mm/sec). Then, the draw ratio was returned to 2.1 times and the resulting product was subjected to heat setting at 200° C. for 5 minutes. The obtained PTFE porous film had a thickness of 36 μm, a water permeability Q of 998 liter/hr·m²·atm, a porosity of 55%, a removal ratio of uniform particles having 0.038 μm diameter of 76%, and a removal ratio of 100% for particles having a 0.069 μm diameter.

EXAMPLE 23

The PTFE molded product (4) obtained in Example 15 was stretched at 74° C. in the biaxial directions sequentially each in a draw ratio of 2.75 times (stretching speed: 50 mm/sec). Then, the draw ratio was returned to 2.1 times and the resulting product was subjected to heat setting at 250° C. for 5 minutes. The obtained PTFE porous film had a thickness of 36 μm, a water permeability Q of 964 liter/hr·m²·atm, a porosity of 55%, a removal ratio of uniform particles having 0.038 μm diameter of 95%, and a removal ratio of 100% for particles having a 0.069 μdiameter.

What is claimed is:

1. A process for preparing a polytetrafluoroethylene porous film comprising the steps of compression-molding a polytetrafluoroethylene resin molding powder obtained by a suspension polymerization to prepare a polytetrafluoroethylene preform, sintering the preform at a temperature not lower than the melting point of the unsintered polytetrafluoroethylene, processing the sintered preform into films, then superposing at least two of the films one upon another and fusing them at a temperature not lower than the melting point of the sintered polytetrafluoroethylene resin to unite them, followed by cooling, and then subjecting the fused and united film to uniaxial or biaxial stretching at a temperature not higher than the melting point of the sintered polytetrafluoroethylene resin.

2. A process for preparing a polytetrafluoroethylene porous film comprising the steps of compression-molding a polytetrafluoroethylene resin molding powder obtained by a suspension polymerization to prepare a polytetrafluoroethylene preform, sintering the preform at a temperature not lower than the melting point of the unsintered polytetrafluoroethylene, processing the sintered preform into films, then superposing at least two of the films one upon another and fusing them at a temperature not lower than the melting point of the sintered polytetrafluoroethylene resin to unite them, followed by cooling, then subjecting the fused and united film to uniaxial or biaxial stretching at a temperature not higher than the melting point of the sintered polytetrafluoroethylene resin, and subjecting the film to heat setting.

3. A process for preparing a polytetrafluoroethylene porous film comprising the steps of compression-molding a polytetrafluoroethylene resin molding powder obtained by a suspension polymerization to prepare a polytetrafluoroethylene preform, sintering the preform at a temperature not lower than the melting point of the unsintered polytetrafluoroethylene, processing the sintered preform into films, then heating at least two of the obtained polytetrafluoroethylene films at a temperature lower than the melting point of the sintered polytetrafluoroethylene to contact bond them, further heating the polytetrafluoroethylene film bonded product at a temperature not lower than the melting point of the sintered polytetrafluoroethylene to fuse and unite it, and subjecting the fused and united film to uniaxial or biaxial stretching at a temperature not higher than the melting point of the sintered polytetrafluoroethylene resin.

4. A process for preparing a polytetrafluoroethylene porous film comprising the steps of compression-molding a polytetrafluoroethylene resin molding powder obtained by a suspension polymerization to prepare a polytetrafluoroethylene preform, sintering the preform at a temperature not lower than the melting point of the unsintered polytetrafluoroethylene, processing the sintered preform into films, then heating at least two of the obtained polytetrafluoroethylene films at a temperature lower than the melting point of the sintered polytetrafluoroethylene to contact bond them, further heating the polytetrafluoroethylene film bonded product at a temperature not lower than the melting point of the sintered polytetrafluoroethylene to fuse and unite it, subjecting the fused and united film to uniaxial or biaxial stretching at a temperature not higher than the melting point of the sintered polytetrafluoroethylene resin, and then subjecting the film to heat setting.

5. The process for preparing a polytetrafluoroethylene porous film as claimed in claim 3 or claim 4, wherein the heating temperature for preparing the polytetrafluoroethylene film bonded product by heating and contact bonding at least two of the polytetrafluoroethylene films is within the range of 100° to 300° C.

6. The process for preparing a polytetrafluoroethylene porous film as claimed in any of claims 1 to 4, wherein the stretching temperature for stretching the fused and united polytetrafluoroethylene film is within the range of 19° to 320° C.

* * * * *